*(12)* United States Patent
Chen et al.

*(10)* Patent No.: US 11,915,083 B2
*(45)* Date of Patent: Feb. 27, 2024

(54) STICK-ON SECURE HOLDER FOR TRACKING DEVICES

(71) Applicant: CASE-MATE, INC., Atlanta, GA (US)

(72) Inventors: Jianzhi Chen, Cumming, GA (US); Saumil Chetan Mody, Atlanta, GA (US); Christopher D'Adamo, Woodstock, GA (US)

(73) Assignee: CASE-MATE, INC., Atlanta, GA (US)

( * ) Notice: Subject to any disclaimer, the term of this patent is extended or adjusted under 35 U.S.C. 154(b) by 0 days.

(21) Appl. No.: 17/832,211

(22) Filed: Jun. 3, 2022

(65) Prior Publication Data

US 2022/0391656 A1 Dec. 8, 2022

Related U.S. Application Data

(60) Provisional application No. 63/197,005, filed on Jun. 4, 2021.

(51) Int. Cl.
*G06K 19/077* (2006.01)
*G06K 19/07* (2006.01)

(52) U.S. Cl.
CPC ... *G06K 19/07728* (2013.01); *G06K 19/0723* (2013.01); *G06K 19/07758* (2013.01)

(58) Field of Classification Search
CPC ......... G06K 19/07728; G06K 19/0723; G06K 19/07758; G06K 19/00; G06K 19/07; G06K 19/067
USPC ........................................ 235/492, 487, 375
See application file for complete search history.

(56) References Cited

U.S. PATENT DOCUMENTS

| | | | |
|---|---|---|---|
| 7,142,121 B2 | 11/2006 | Chan et al. | |
| D680,015 S | 4/2013 | Hauser et al. | |
| 8,878,671 B2 | 11/2014 | Buchheim et al. | |
| D738,248 S | 9/2015 | Nagel | |
| 10,763,588 B2 | 9/2020 | McCall, II et al. | |
| 10,771,603 B2 | 9/2020 | Lewis | |
| 10,957,436 B1 | 3/2021 | Aertker et al. | |
| D918,072 S | 5/2021 | Umair et al. | |
| D920,143 S | 5/2021 | Painter et al. | |
| 11,057,689 B1 | 7/2021 | Klein | |
| D936,505 S | 11/2021 | Umair et al. | |
| 11,241,077 B2 | 2/2022 | Lewis | |
| 2008/0135326 A1 | 6/2008 | Lou-Hsiao | |
| 2008/0303668 A1 | 12/2008 | Rohlf et al. | |
| 2013/0002481 A1 | 1/2013 | Solomon | |
| 2014/0132411 A1 | 5/2014 | Buchheim et al. | |
| 2015/0136621 A1* | 5/2015 | Lebauer ............... | A45C 11/008 206/216 |
| 2017/0103297 A1* | 4/2017 | Daoura ............. | G06Q 10/0833 |

FOREIGN PATENT DOCUMENTS

| | | |
|---|---|---|
| CN | 108648424 | 10/2018 |
| CN | 209399978 U * | 9/2019 |
| CN | 306814589 | 9/2021 |

(Continued)

*Primary Examiner* — Edwyn Labaze
(74) *Attorney, Agent, or Firm* — Perilla, Knox & Hildebrandt, LLP

(57) ABSTRACT

A holder or mounting device for attaching or affixing an electronic tracking device such as an Apple™ AirTag™ or Tile™ to a tracked item or object. In example embodiments, the holder or mounting device may include an adhesive, a cord, a clip, a strap or other attachment means.

6 Claims, 6 Drawing Sheets

(56) References Cited

FOREIGN PATENT DOCUMENTS

| | | | |
|---|---|---|---|
| CN | 306843983 | | 9/2021 |
| CN | 113576450 A | * | 11/2021 |
| CN | 307127923 | | 2/2022 |
| EM | 008598999-0001 | | 7/2021 |
| GB | 2575443 | | 1/2020 |
| GB | 6194869 | | 3/2022 |
| GB | 6194870 | | 3/2022 |
| JP | D1688236 | | 6/2021 |
| KR | 2020-0039491 | | 4/2020 |
| KR | 301124673.0000 | | 8/2021 |
| TW | M599627 | | 8/2020 |

* cited by examiner

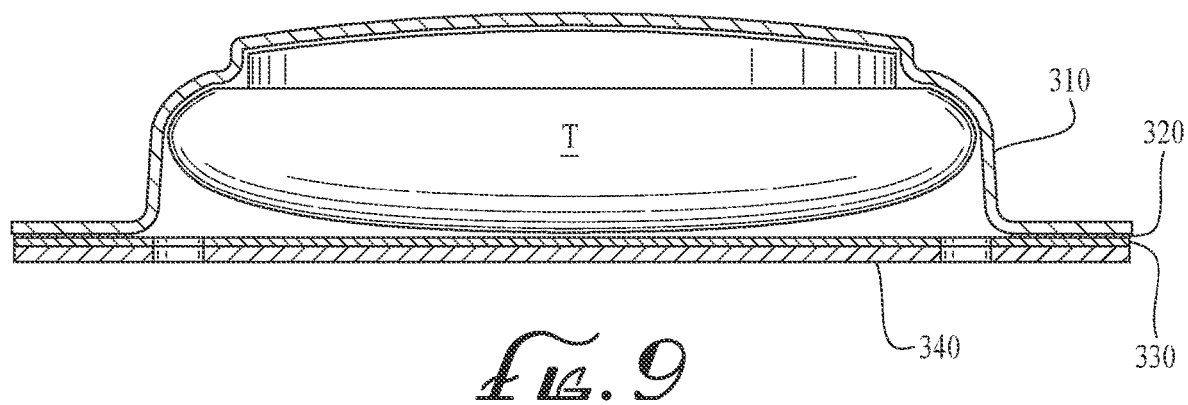
fig.9
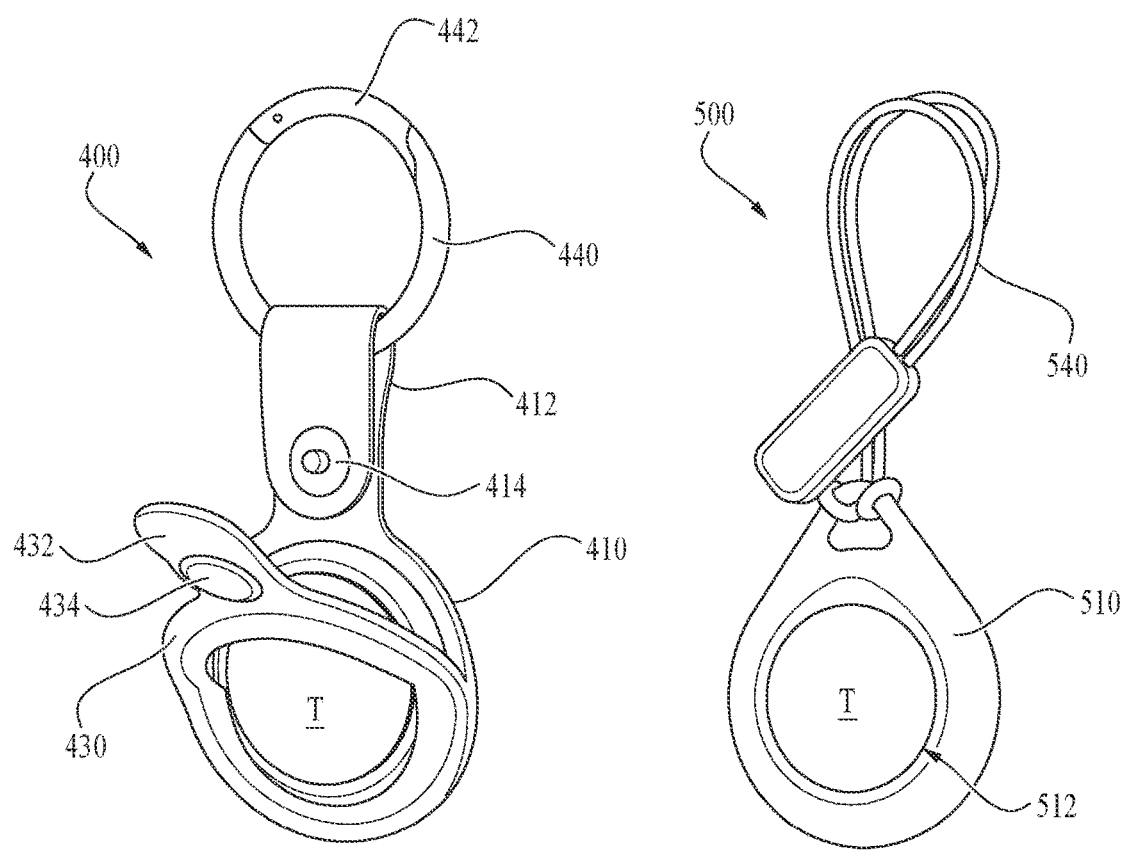
fig.10
fig.11

STICK-ON SECURE HOLDER FOR TRACKING DEVICES

CROSS-REFERENCE TO RELATED APPLICATION

This application claims the benefit of U.S. Provisional Patent Application Ser. No. 63/197,005 filed Jun. 4, 2021, the entirety of which is hereby incorporated herein by reference for all purposes.

TECHNICAL FIELD

The present invention relates generally to the field of accessories for electronic devices, and more particularly to a holder or case for attaching an electronic tracking accessory device to an item or object.

BACKGROUND

Tracking accessories such as Apple's™ AirTags™ or Tile's™ trackers may be used to help locate items if lost or moved. It has been found that needs exist for improved means of attaching such tracking accessories to an item or object, and or for protecting the tracking accessory in use.

It is to the provision of a holder or attachment device meeting these and other needs that the present invention is primarily directed.

SUMMARY

In example embodiments, the present invention provides a holder or attachment device for attaching an electronic tracking accessory to an item or object.

In one aspect, the present invention relates to a mounting device for a tracking accessory. The mounting device includes a first shell having a first side and a second side and a second shell removably secured to the first side of the first shell. The second shell comprises one or more apertures for channeling sound from the tracking accessory.

Optionally, the first and second shell portions comprise thermoplastic elastomer. In some example embodiments, the first and second shell portions comprise thermoplastic polyurethane.

Optionally, the first shell portion comprises a first base portion and a first plurality of protrusions extending from the first base portion for spacing the tracking accessory from the first base portion. Additionally, the second shell portion comprises a second base portion and a second plurality of protrusions extending from the second base portion for spacing the tracking accessory from the second base portion. Still additionally, the first and second pluralities of protrusions are configured for retaining the tracking accessory therebetween. Optionally, the first and second pluralities of protrusions are configured for orienting the tracking accessory therebetween. Optionally, each of the pluralities of protrusions comprise curved support surfaces. Still optionally, each of the pluralities of protrusions are radially oriented.

Optionally, at least one of the first and second shell portions are impact resistant.

Optionally, the tracking accessory is removable from the mounting device.

Optionally, the mounting device further comprises an adhesive material for attaching the mounting device to a tracked item or object.

Optionally, the mounting device further comprises a height of about 0.39 inches (10 millimeters).

In another aspect, the present invention relates to a protective enclosure for a tracker for tracking an item. The protective enclosure comprises a bottom case portion, a top case portion configured for detachable engaging with the bottom shell, and an adhesive for securing the protective enclosure to the tracked item. The top case portion comprises one or more sound openings and at least one notch for separating the top case portion from the bottom case portion. Moreover, the top and bottom case portions comprise cooperative engagement elements (such as for example cooperative lips or hooks) for mechanically engaging the top case portion to the bottom case portion.

Optionally, at least one of the bottom and top case portions comprises thermoplastic elastomer.

Optionally, at least one of the bottom and top case portions comprises a set of projections for retaining and securing the tracker.

Optionally, each of the bottom and top case portions comprises a set of projections for retaining and securing the tracker therebetween.

Optionally, the mechanical engagement is a snap-fit connection or engagement.

In yet another aspect, the present invention relates to a method of removably securing a tracking accessory to an item to be tracked. The method comprises first providing a protective case for the tracking accessory, the protective case comprising a first case portion with a first side and a second side, a second case portion configured for detachably securing to the first side of the first case portion, and an adhesive applied to the second side of the first case portion. Second, the method comprises adhering the second side of the first case portion of the protective case to the tracked item (i.e., item to be tracked). Third, the method comprises aligning the tracking accessory to the first side of the first case portion and placing the tracking accessory on the first case portion thereon. Finally, the method comprises removably securing the second case portion to the first case portion, enclosing the tracking accessory between the first and second case portions.

Optionally, the step of aligning the tracking accessory to the first case portion and placing the tracking accessory thereon comprises aligning the tracking accessory to a set of radial support projections on the first side of the first case portion and placing the tracking accessory thereon.

Optionally, the step of removably securing the second case portion to the first case portion comprises pressing the second case portion onto the first case portion such that an inwardly extending lip or flange of the second case portion hooks onto or interlocks with an outwardly extending flange or lip of the first case portion.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of example embodiments are explanatory of example embodiments of the invention, and are not restrictive of the invention, as claimed.

BRIEF DESCRIPTION OF THE DRAWINGS

FIG. 9 is a cross-sectional view of the tracking accessory mounting device of FIG. 7.

FIG. 10 is a tracking accessory key-chain holder for use with electronic tracking accessories according to an example embodiment of the present invention.

FIG. 11 is a tracking accessory key-chain holder for use with electronic tracking accessories according to another example embodiment of the present invention.

DETAILED DESCRIPTION OF EXAMPLE EMBODIMENTS

Figure 1:
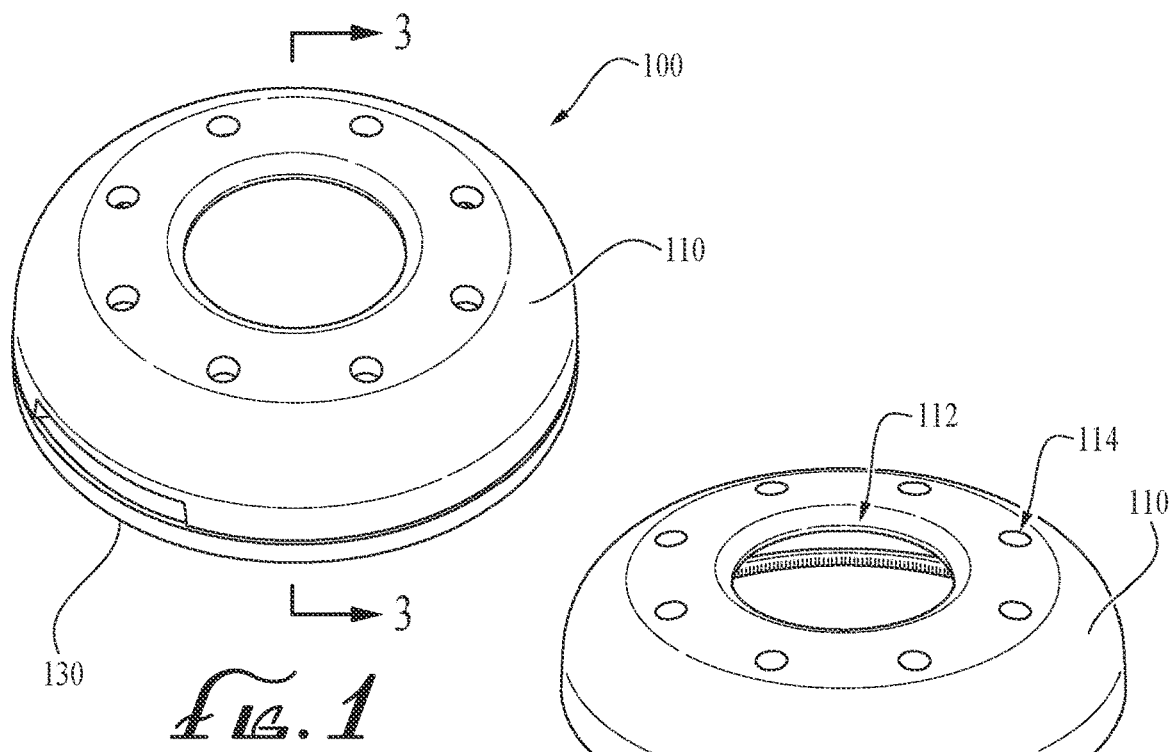
FIG. 1 shows a tracking accessory mounting device or holder for use with electronic tracking accessories according to an example embodiment of the present invention.

The present invention may be understood more readily by reference to the following detailed description of example embodiments taken in connection with the accompanying drawing figures, which form a part of this disclosure. It is to be understood that this invention is not limited to the specific devices, methods, conditions, or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

The present invention provides a holder or attachment device for attaching an electronic tracking accessory to an item or object. Generally, the holders or attachment devices are compatible with tracking accessories, such as for example Apple's™ AirTags™ or Tile's™ trackers, used to help keep track of items or objects and locate them if misplaced, lost or moved. The attachment devices provide protective enclosures for the tracking accessories and means for attaching the tracking accessories to the other items or objects. For example, a holder or mounting device may be affixed or attached to a cell phone, a case for a cell phone, car keys, a laptop or tablet computer, a wallet, headphones/earbuds, a purse or briefcase, an automobile, a bicycle, a toy, and/or other items or objects; or to pets, children or other persons or animals. In some example embodiments, the holder or mounting device protects the tracking accessory from damage (impact, water, etc.). In some example embodiments, the holder or mounting device provides more secure attachment of the tracking accessory to another object than the typical self-adhesive material that may be provided with the tracking accessory. In some example embodiments, the holder or mounting device allows interchangeable use of the tracking accessory between multiple objects (move from object to object, rather than directly and permanently attaching the tracking accessory to a single object with adhesive). In other example embodiments, the holder or mounting device optionally also incorporates a pop-out or hinged-ring type holder for allowing a user to grip the item or object to which the holder is mounted, one or more magnetic attachment features for attachment of the holder to a case or to a magnetic mount, LED lights, and/or other peripheral accessories.

Figure 7:
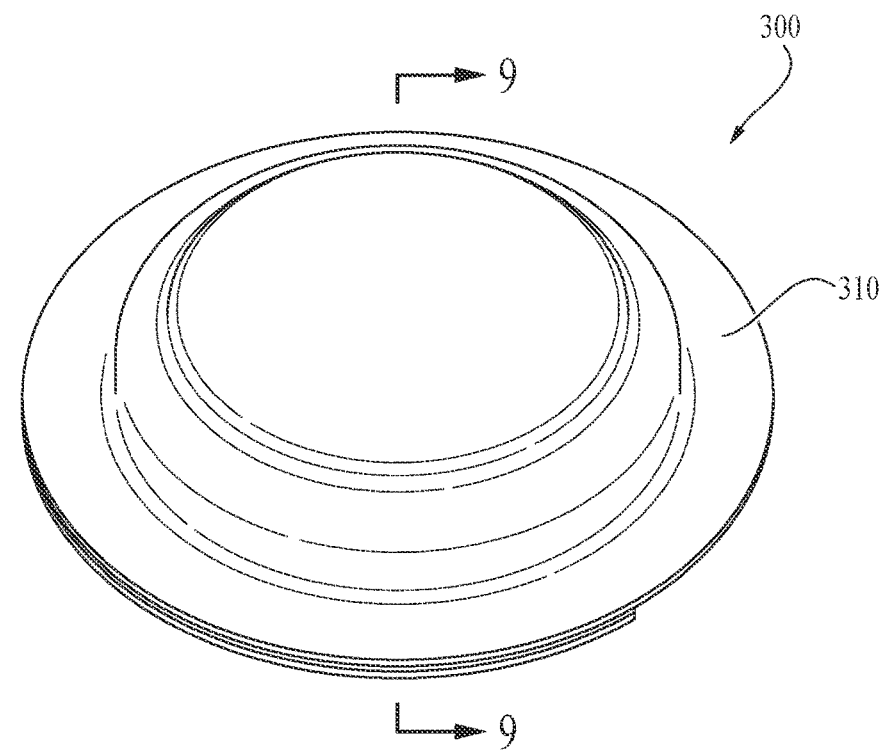
FIG. 7 shows a tracking accessory mounting device or holder for use with electronic tracking accessories according to yet another example embodiment of the present invention.
Figure 8:
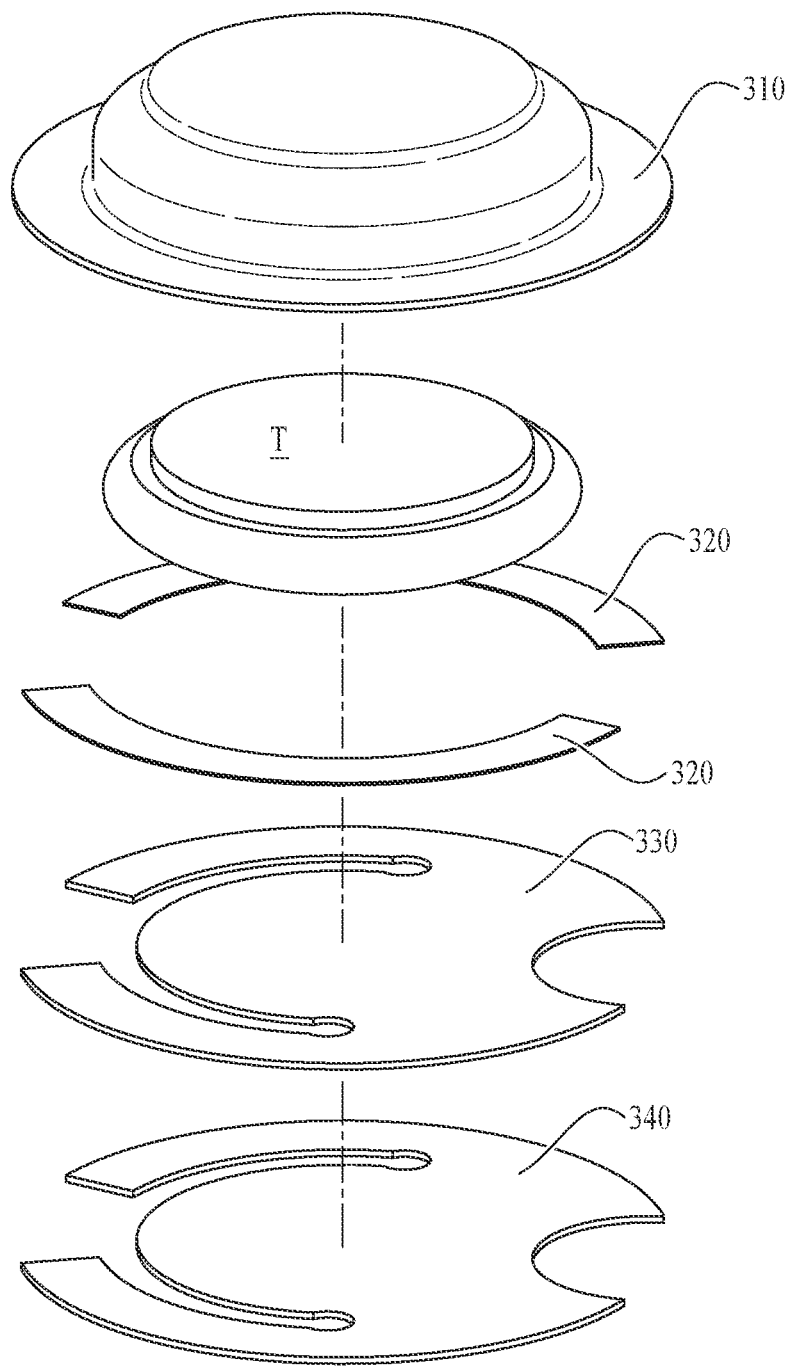
FIG. 8 is an exploded view of the tracking accessory mounting device of FIG. 7.

With reference now to the drawing figures, wherein like reference numbers represent corresponding parts throughout the several views, FIGS. 1-6 show example forms of holders or attachment devices with removable covers for releasably retaining and securing a tracking accessory or tracker to an item or object to be tracked. FIGS. 7-9 show another example form of holders or attachment devices with a fixed cover for semi-permanently securing a tracking accessory to an item or object to be tracked. FIGS. 10 and 11 show yet other example embodiments of the holders or attachment devices in the form of key chains and pendant cases for securing a tracking accessory to other items or objects to be tracked.

Figure 2:
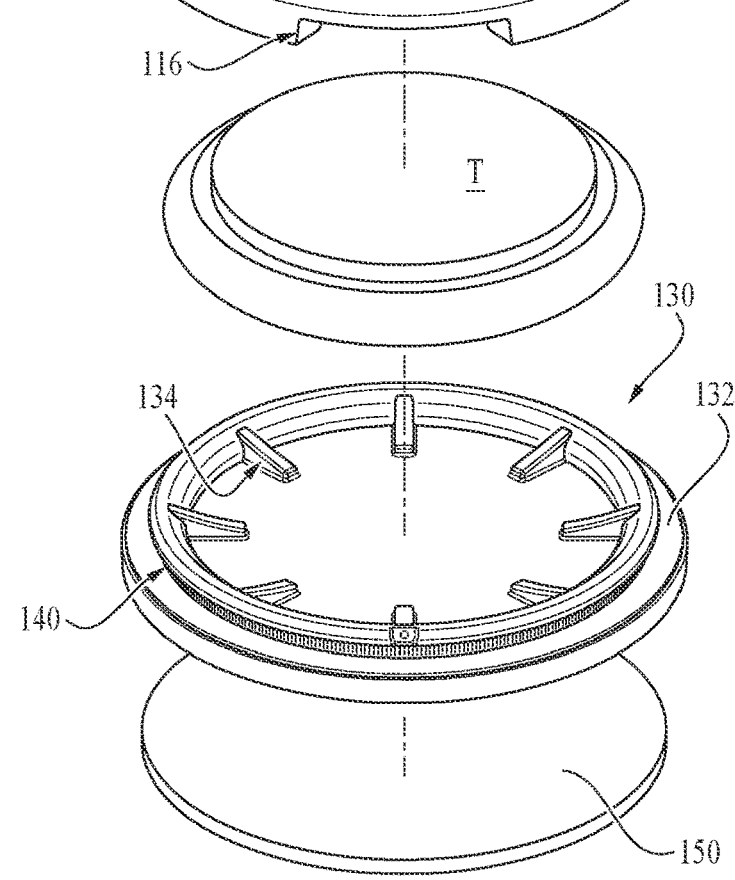
FIG. 2 is an exploded view of the tracking accessory mounting device of FIG. 1.
Figure 3:
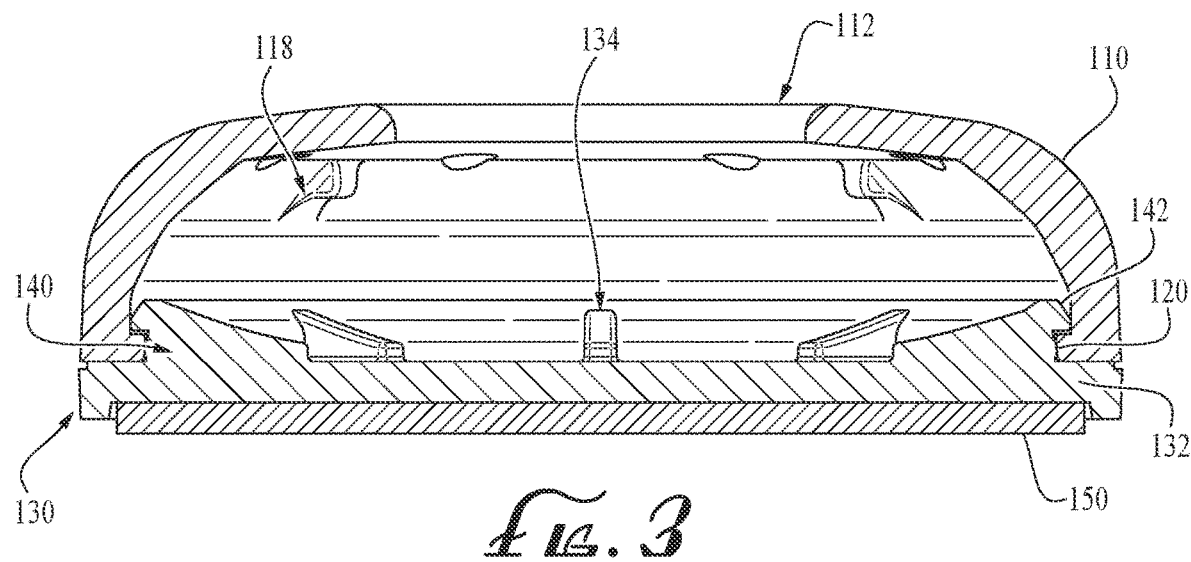
FIG. 3 is a cross-sectional view of the tracking accessory mounting device of FIG. 1.

FIGS. 1-3 show an example embodiment of a tracking accessory attachment or mounting device 100. The tracking accessory attachment device 100 generally comprises a tough, impact-resistant hard outer shell, the outer shell comprising a first, bottom shell or portion 130 and a second, top shell or portion 110. The top shell 110 is configured for detachably engaging the bottom shell 130, the top and bottom shells defining an enclosure or cavity for receiving and retaining a tracking accessory T therein. In example embodiments, the tracking accessory attachment device 100 comprises a generally round or circular shape; however, the tracking accessory attachment device may comprise various forms, shapes, and/or profiles (including, but not limited to, the shapes, forms, and profiles described below). A self-adhesive material or backing 150 is applied to a side of the bottom shell 150 generally opposite the top shell 110.

The top and bottom shells 110, 130 are preferably injection molded or otherwise formed from a substantially rigid, tough and impact-resistant material such as thermoplastic polyurethane (TPU), polycarbonate (PC), Acrylonitrile butadiene styrene (ABS), Nylon, polystyrene, and/or other hard plastic or polymeric material(s) of construction, or alternatively may be formed from metal, wood and/or other material(s). The top and bottom shells 110, 130 preferably have a material thickness sufficient to provide the desired level of impact protection, and optionally may include reinforcing ribs, flanges or other structural elements for improved strength. In example embodiments, the attachment or mounting device 100 comprises a thickness (measured from the bottom side of the self-adhesive material or backing 150 to the top side of the top shell 110) of about 0.35 inches (9 millimeters) to about 0.59 inches (15 millimeters), or more preferably about 0.39 inches (10 millimeters).

In example embodiments, the top shell 110 comprises a round, dome-like profile with a central opening or aperture 112 at about its center. The aperture 112 serves as a visual window to quickly and easily confirm whether a tracking accessory T is enclosed inside the outer shell during use. The top shell further comprises one or more sound channels or openings 114 for channeling sound from the tracking accessory T during use. For example, in the depicted embodiment as shown in FIG. 1, the attachment device 100 comprises eight sound openings 114 arranged in a circular pattern around the central opening 112. In example embodiments, the sound openings 114 channel sound from the enclosed tracking accessory T to enhance or amplify the sound such that the sound is projected more clearly and loudly from the mounting device 100, for example, than without the sound openings 114. At its bottom, exposed edge, the top shell 110 comprises an inwardly extending flange or fin 120 extending substantially transversely from the exposed edge towards the center, or axial axis (not shown), of the top shell 110. The top shell 110 optionally also comprises at least one release recess or notch 116 provided along the outer edge or perimeter of the top shell. In example embodiments, the release notch 116 facilitates removal or replacement of the tracking accessory T. More specifically, the release notch 116 helps in separating or detaching the top shell 110 from the bottom shell 130 by providing an accessible opening to leverage or pry apart when separating the top shell from the bottom shell.

In example embodiments, the bottom shell portion 130 comprises a round, disc-like profile with a first, top side and a second, bottom side opposite the first side. The bottom and top shells are similarly dimensioned such that, when assembled, the outer edge surfaces of the top and bottom shells are substantially co-planar or flush with one another so as to prevent overhanging edges or portions which may get caught during use and cause the shells to inadvertently separate from one another. The bottom shell 130 further comprises a wall 140 extending transversely from the top side of the bottom shell portion 130. In example embodiments, the wall 140 forms a circular wall having an outer diameter less than the overall diameter of the bottom shell 130. At its top, free end, the wall 140 comprises a transverse flange 142 extending outwardly towards the perimeter (or away from the center) of the bottom shell 130 and extends substantially parallel to the bottom shell 130.

As best shown in FIG. 3, the top shell 110 further comprises one or more support projections or protrusion 118 inwardly extending from an interior surface of the top shell, and the bottom shell 130 comprises one or more support projections or protrusions 134 inwardly extending from the inner wall 140 and upwardly from the top side surface of the bottom shell 130 (i.e., in a direction opposite of the bottom side surface of the bottom shell 130). The support projections 118, 134 are generally configured to help locate, oriented and/or retain the tracking accessory T properly in the center of the attachment device 100 during use. In example embodiments, the support projections 118, 134 function, for example like bumpers, and space the tracking accessory from the outer shell portions 110 and 130. As such, the support projections 118 and 134 provide greater protection to the tracking accessory from impacts to the outer shell.

In example embodiments, the support projections 118 and 134 are generally configured to conform to the exterior profile of the tracking accessory. For example, as best shown in FIG. 3, each of the support projections 118 and 134 comprise a generally ramped or sloped surface configured for mating or coming into contact with the exterior surface of the tracking accessory T and aiding in correctly orienting the tracking accessory on the support projections. In example embodiments, the sloped surface is further contoured or curved to match or complement the exterior curvature of the tracking accessory T. Moreover, in example embodiments, a plurality of support projections 118 and a plurality of support projections 134 are provided on the top and bottom shells 110, 130, respectively, wherein the support projections 118 and 134 are arranged in a circular pattern with each support projection radially oriented with respect to the center of the respective top or bottom shell (i.e., each projection extends from a greater radial distance to a lesser radial distance to a central axial axis (not shown)).

In example embodiments, the mounting device 100 further comprises a self-adhesive material or backing 150 for semi-permanently securing at least the bottom shell 130 to a suitable surface on the item or object to be tracked. For example, the bottom shell 130 may be secured to an exterior surface of a cell phone, under the seat of a bicycle, on an interior sidewall of a luggage, etc. In some example embodiments, the adhesive material or backing 150 is especially suitable for, but not limited to, adhesion to Low Surface Energy (LSE) surfaces. Optionally, the semi-permanent adhesive 150 may allow for removal and reuse (e.g., using the same adhesive or with a replacement adhesive). In example embodiments, the self-adhesive backing 150 comprises for example 3M™ VHB™ tapes.

FIG. 3 also shows an example method of securing the top and bottom shells to one another. In example embodiments, the top shell 110 comprises at least one inwardly extending flange or fin 120 for releasably inter-engaging or interlocking with at least one outwardly extending flange or fin 142 of the bottom shell 130. In the depicted embodiment, the inwardly extending flange 120 extends entirely around the interior surface of the exposed edge of the top shell 110. Similarly, the outwardly extending flange 142 wraps entirely around the exposed edge of the wall 140—wherein the outwardly extending flange 142 is configured to releasably inter-engage the inwardly extending flange 120 of the top shell 110—as shown in FIG. 3.

In example methods of use, a tracking accessory T is aligned to the support projections 134 and placed thereon. The top shell 110 is then secured to the bottom shell 130 by aligning the top shell 110 to the bottom shell 130 and firmly pressing the top shell 110 against the bottom shell 130. With sufficient force, interference between the inwardly extending flange 120 of the top shell 110 and the outwardly extending flange 142 of the bottom shell 130 causes at least portions of either the top shell 110, the bottom shell 130, or both shells, to resiliently deform around the other to overcome the interference and thereby causes the inwardly extending flange 120 and outwardly extending flange 142 to interlock with one another (for example, like a snap-fit engagement). In some example embodiments, the inwardly and outwardly extending flanges 120, 142 may additionally comprise sloped or inclined surfaces to further facilitate the snap-fit engagement between the top and bottom shells. Conversely, to separate or detach the top shell from the bottom shell, the user pries or pulls the release notch 116 away from the bottom shell. As the release notch 116 is pulled from the bottom shell 130, the top shell 110 is resiliently deformed to disengage the inwardly extending flange 120 from the outwardly extending flange 142.

In example embodiments, the bottom shell 130 may be secured to the item or object to be tracked (the "tracked item or object") before or after the top shell 110 is secured to the bottom shell. Advantageously, the attachment or mounting device 100 according to example embodiments of the present invention, allows the user to remove and replace the tracking accessory from the mounting device 100 without having to remove or detach the mounting device (or at least the bottom shell 130 of the mounting device) from the tracked item or object.

Figure 4:
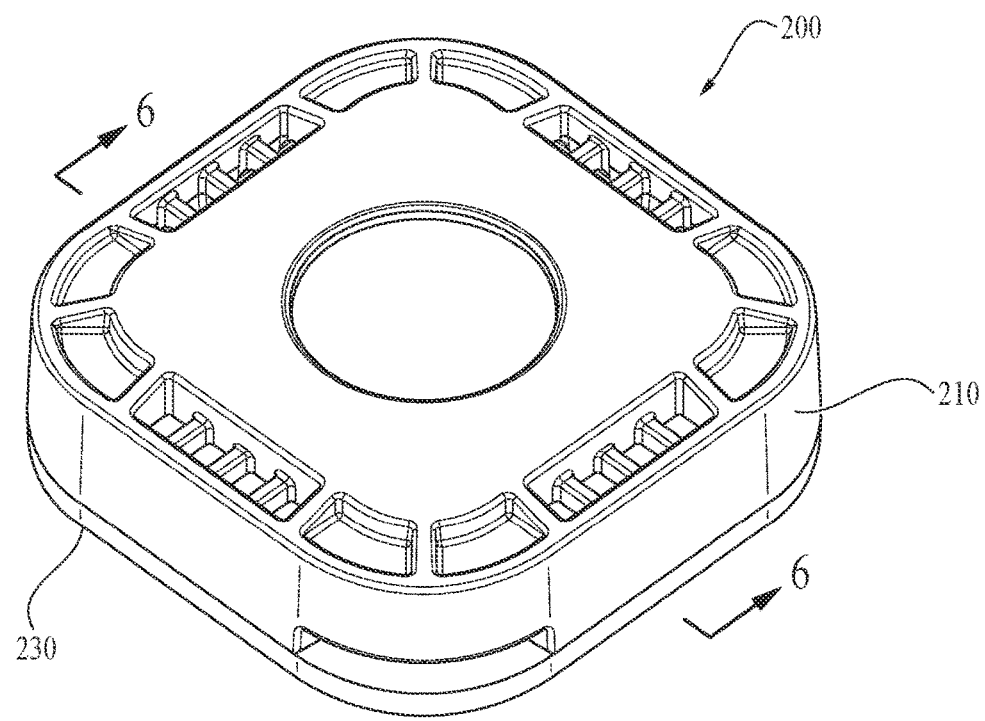
FIG. 4 shows a tracking accessory mounting device or holder for use with electronic tracking accessories according to another example embodiment of the present invention.
Figure 5:
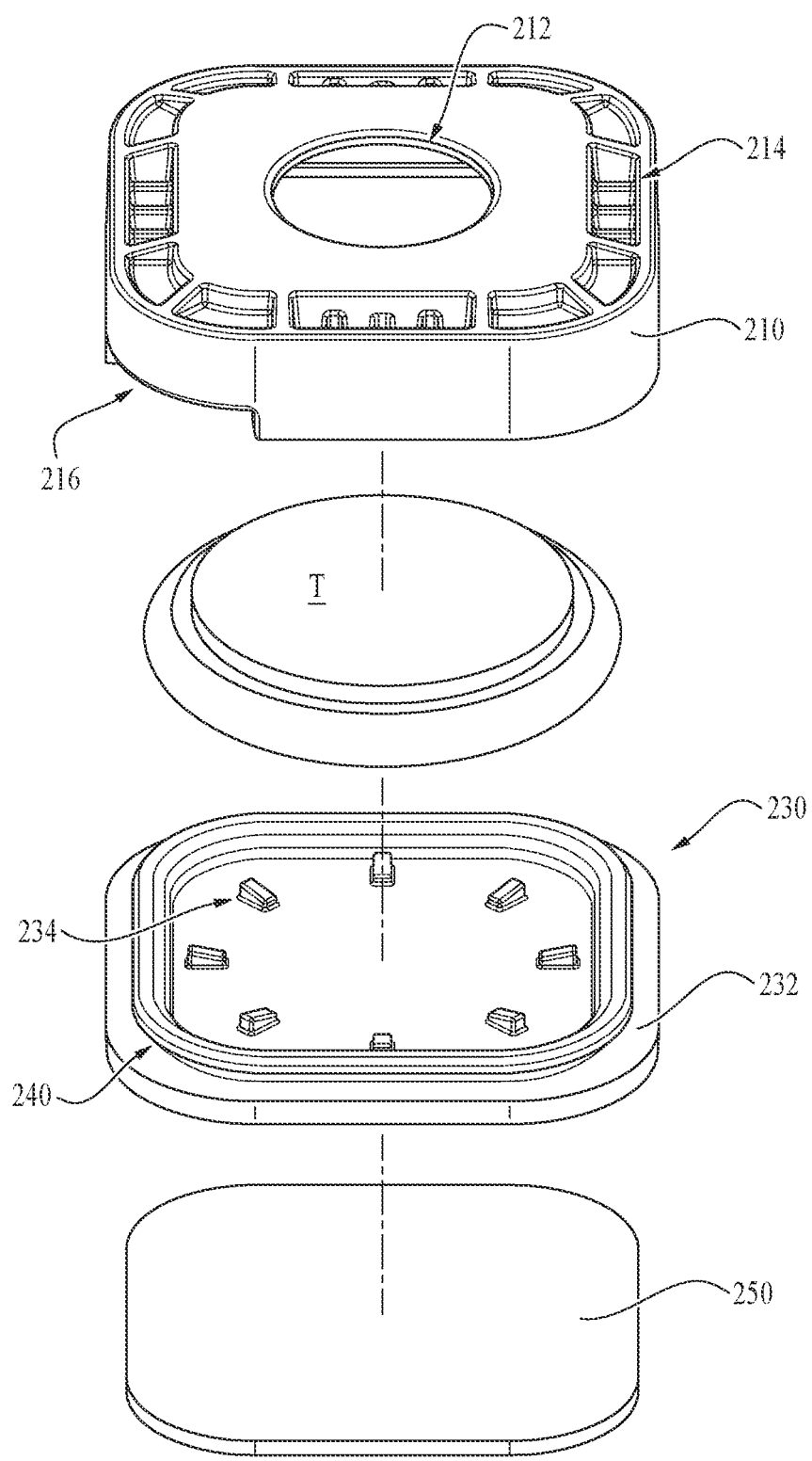
FIG. 5 is an exploded view of the tracking accessory mounting device of FIG. 4.
Figure 6:
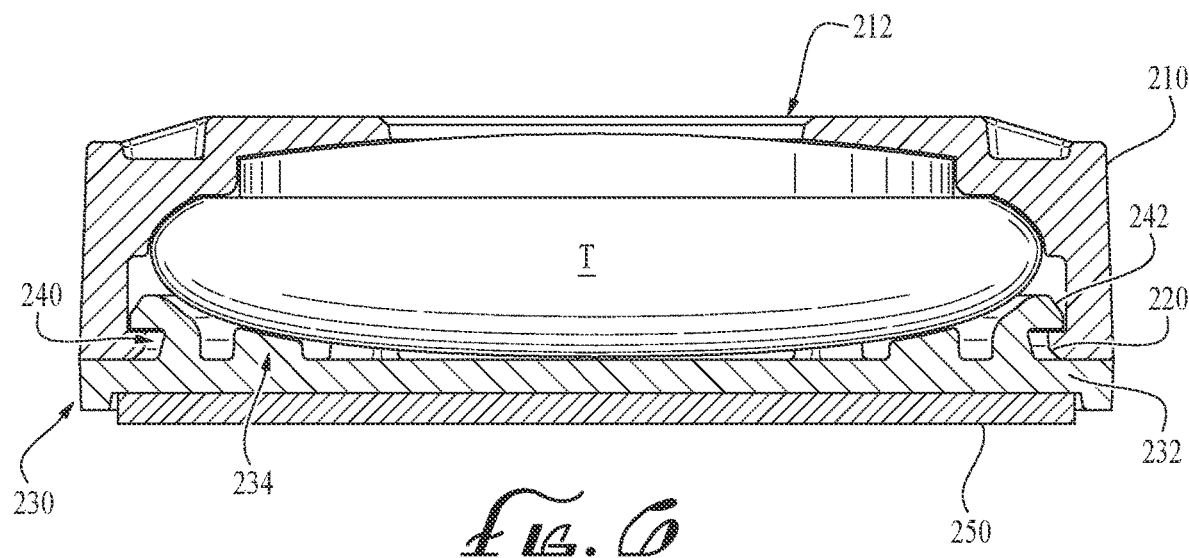
FIG. 6 is a cross-sectional view of the tracking accessory mounting device of FIG. 4.

FIGS. 4-6 show a tracking accessory attachment or mounting device 200 according to another example embodiment of the present invention. In example embodiments, the tracking accessory mounting device 200 comprises a tough, impact-resistant hard outer shell, the outer shell comprising a first, bottom shell or portion 230 and a second, top shell or portion 210. The top shell 210 is configured for releasably coupling to the bottom shell 230, the top and bottom shells defining an enclosure or cavity for receiving and retaining a tracking accessory T therein when coupled together. In example embodiments, the mounting device 200 comprises a generally square profile with rounded corners as shown. A self-adhesive material or layer 250 is applied to a side of the bottom shell 250 generally opposite the top shell 210.

The top and bottom shells 210, 230 are preferably injection molded or otherwise formed from a substantially rigid, tough and impact-resistant material such as thermoplastic polyurethane (TPU), polycarbonate (PC), Acrylonitrile butadiene styrene (ABS), Nylon, polystyrene, and/or other hard plastic or polymeric material(s) of construction, or alternatively may be formed from metal, wood and/or other material(s). The top and bottom shells 210, 230 preferably have a material thickness sufficient to provide the desired level of impact protection, and optionally may include reinforcing ribs, flanges or other structural elements for improved strength. In example embodiments, the attachment or mounting device 200 comprises a thickness (measured from the bottom side of the self-adhesive material or backing 250 to the top side of the top shell 210) of about 0.35 inches (9 millimeters) to about 0.59 inches (15 millimeters), or more preferably about 0.39 inches (10 millimeters).

In general, the mounting device 200 is substantially similar to the mounting device 100 as described above. For example, as shown in FIGS. 5 and 6, tracking accessory mounting device 200 comprises, a bottom shell or case portion 230, a top shell or case portion 210 configured for releasably coupling to the bottom shell portion 230, and an adhesive material 250 secured to an bottom side of the bottom shell 230 for semi-permanently securing the bottom shell 230 to an item or object to be tracked (such as for example a personal belonging, such as an electronic device or luggage; a pet (for example, by securing the mounting device on the pet's collar); or a vehicle, such as a car or bicycle).

Moreover, the top shell 210 also comprises a central opening 212 to provide a quick and easy visual check to determine whether a tracking accessory is enclosed in the mounting device 200 and a plurality of sound channels or openings 214 arranged around the central opening 212 and about the perimeter of the top shell. As described above, the sound channels 214 enhance or amplify the sound projected from the tracking accessory T. The top shell 210 additionally comprises a release notch 216 for facilitating the removal of the top shell 210 from the bottom shell 230 when assembled, as described above. Similarly, the bottom shell portion 230 also comprises a raised wall 240 extending transversely from a top surface of the bottom shell (i.e., the raise wall 240 extends in a direction opposite the bottom side of the bottom shell). The bottom shell portion 230 further comprises a plurality of support protrusions 234 configured to help locate, orient, and/or retain the tracking accessory T properly in the center of the attachment device 200 during use. In example embodiments, the support projections 234 function, for example like bumpers, and space the tracking accessory from the bottom shell 230. As such, the support projections 234 provide greater protection to the tracking accessory from impacts to the outer shell. However, unlike the mounting device 100 as described above, the interior surface of the top shell 210 of the mounting device 200 does not comprise support projections but is rather generally conformed to match the profile of the tracking accessory T to locate and secure the tracking accessory, as shown in FIG. 6. Accordingly, the tracking accessory T is located and retained by the interior surface of the top shell 210 and support projections 234.

At its top, exposed end, the raised wall 240 comprises an outwardly extended flange or fin 242. The outwardly extended flange 242 is configured for inter-engaging or snap-fit coupling with an inwardly extending flange 220 extending from the exposed peripheral edges of the top shell 210 (as described in greater detail above). More specifically, at least one of the outwardly extended flange 242 or the inwardly extended flange 220 are configured to deflect with respect to the other as the top shell 210 is pressed against the bottom shell 230 and the shells interlock with one another.

In example methods of use, a tracking accessory T is aligned to the support projections 234 and placed thereon. The top shell 210 is then secured to the bottom shell 230 by aligning the top shell 210 to the bottom shell 230 and firmly pressing the top shell 210 against the bottom shell 230. With sufficient force, interference between the inwardly extending flange 220 of the top shell 110 and the outwardly extending flange 242 of the bottom shell 130 causes at least portions of either the top shell 210, the bottom shell 230, or both shells, to resiliently deform around the other to overcome the interference and thereby causes the inwardly extending flange 220 and outwardly extending flange 242 to interlock with one another (for example, like a snap-fit engagement). In some example embodiments, the inwardly and outwardly extending flanges 120, 142 may additionally comprise sloped or inclined surfaces to further facilitate the snap-fit engagement between the top and bottom shells. Conversely, to separate or detach the top shell from the bottom shell, the user pries or pulls on the release notch 216 away from the bottom shell. As the release notch 216 is pulled from the bottom shell 230, the top shell 110 is resiliently deformed to disengage the inwardly extending flange 120 from the outward extending flange 142.

FIGS. 7-9 show a mounting device 300 according to yet another example embodiment of the present invention. Generally, the mounting device 300 comprises a circular, cylindrical, or disk-shaped internal chamber sized and shaped to receive a tracking accessory. The mounting device is configured for semi-permanently mounting onto hard surfaces like remotes, keychains, car seats, bikes, drones, electronics, or other items and objects.

In example embodiments, the mounting device 300 comprises a top shell or cover 310, one or more double-sided permanent bond adhesive material 320 (such as for example 3M™ double coated tape), a back plate 330 and a removable adhesive layer 340 (such as for example 3M™ VHB™ tapes). In example embodiments, a tracking accessory T is permanently enclosed between the back plate 330 and the top shell 310 wherein the top shell 310 and the back plate 330 are bonded together by the one or more double-sided permanent bond adhesive materials 320. Whereas the top shells of mounting devices 100 and 200 are detachable from the respective bottom shells, top shell 310 of mounting device 300 is permanently bonded to the back plate 330, making it more difficult to remove the tracking accessory from therewithin. The added security is particularly useful in deterring others from trying to steal or tamper with the tracking accessory secured within the mounting device 300.

In exampled embodiments, the top 310 is preferably injection molded or otherwise formed from a substantially rigid, tough and impact-resistant material such as thermoplastic polyurethane (TPU), polycarbonate (PC), Acrylonitrile butadiene styrene (ABS), Nylon, polystyrene, and/or other hard plastic or polymeric material(s) of construction, or alternatively may be formed from metal, wood and/or other material(s). The back plate 330 is preferably die cut from a substantially durable material such as for example polyethylene terephthalate (PET), thermoplastic polyurethane (TPU), polycarbonate (PC), Acrylonitrile butadiene styrene (ABS), Nylon, polystyrene, and/or other hard plastic or polymeric material(s) of construction, or alternatively may be formed from metal, wood and/or other material(s). The top shell 310 and back plate 330 preferably have a material thickness sufficient to provide the desired level of impact protection, and optionally may include reinforcing ribs, flanges or other structural elements for improved strength.

FIG. 10 shows a tracking accessory holder or mounting device 400 in the form of a clip ring or key ring. Generally, the key ring tracking accessory holder 400 includes a front flap of flexible material foldably or hingedly attached to a back panel to form an internal receiving space or cavity for receiving and retaining the tracking accessory. The front flap and back panel comprise cooperative releasable closure means, such as for example snap fasteners, for securing the tracking accessory therein. The holder may optionally include a heavy-duty ring clip or other peripheral accessories for releasably attaching or securing the key ring tracking accessory holder to other items or objects to be tracked, such as for example keys, luggage, purses, etc.

In example embodiments, the key ring tracking accessory mounting device 400 includes a base portion or back panel 410. An elongated strap or band extends from a first, top end of the back panel 410 providing a loop 412 for receiving and connecting a key ring 440. At a second, bottom end (generally opposite the first, top end) of the back panel 410, a flexible front flap or panel 430 is hingedly secured to the panel. In example embodiments, lower or bottom portions of the back panel 410 and the front panel 430 are coupled together (e.g., stitched or bonded together) to define a pocket or cavity for receiving and retaining a tracking accessory T therein. In example embodiments, the front panel 430 may further comprise an opening or cutout to at least partially reveal the tracking accessory T secured in the tracking accessory holder 400 during use. Optionally, the front panel 430 may further comprise a leverage tab or extension 432 with a first closure element 434 configured for cooperatively engaging a reciprocal second closure element 414 provided on the loop 412 or back panel 410. In the depicted embodiment, for example, the first and second closure elements 434, 414 are reciprocal components of an interlocking snap fastener (i.e., the male and female components of a snap fastener). However, in other example embodiments, the closure elements 434 and 414 may comprise hook-and-loop fasteners, a combination of button(s) and slot(s), reusable adhesives, and/or other releasable closure means for retaining the tracking accessory in the cavity or enclosure between the front and back panels 430, 410.

In example embodiments, the front flap 430 and back panel 410 are formed from flexible, durable materials such as for example leather, rubber, fabric, and/or other similarly suited materials.

In example modes of use, the first closure element 434 is disengaged or disconnected from the second closure element 414 to reveal the pocket between the front panel 430 and the back panel 410. For example, the front panel 430 may be separated from the back panel 410 by pulling the leverage tab 432 away from loop 412 and thereby disengaging the first closure element 434 from the second closure element 414. A tracking accessory T may then be placed in the pocket and secured therein by securing the first closure element to the second closure element once again. The key ring tracking accessory holder 400 can then be secured to other items or objects, such as for example keys, luggage, purses, etc., via the key ring 440. In example embodiments, the key ring 440 is a key ring clip with a spring-biased gate 442. In other example embodiments, the key ring 440 may be replaced with, or further include, spring clips, bolt snap clips, key rings (with or without spring-loaded gates), and/or other suitable clasps, clips, rings, and/or other peripheral accessories for releasably securing the mounting device 400 from the tracked item or object.

FIG. 11 shows a corded or tethered holder or mounting device 500 according to still another example embodiment of the present invention. The corded tracking accessory holder 500 features a durable strap or cord 540 which can be easily tied or looped onto other items or objects to be tracked, such as for example keys, luggage, purses, etc. In example embodiments, the tethered holder or mounting device 500 includes a retaining body or a base portion 510 comprising a resilient material surrounding a generally circular or otherwise configured opening 512 configured to receive and removably retain a tracking accessory T therein. The tethered mounting device 500 is generally configured to allow users to easily insert or remove the tracking accessory T from the retaining body 510. In example embodiments, the holder 500 further includes a cord or lanyard 540 secured to the retaining body 510, wherein the cord 540 may be used to easily secure the corded holder 500 to keys, luggage, purses, or etc.

While the invention has been described with reference to example embodiments, it will be understood by those skilled in the art that a variety of modifications, additions and deletions are within the scope of the invention, as defined by the following claims.

What is claimed is:

1. A method of removably securing a tracking accessory to an item to be tracked, the method comprising:
providing a protective case for the tracking accessory, the protective case comprising a first case portion with a first side and a second side, a second case portion configured for detachably securing to the first side of the first case portion, and an adhesive applied to the second side of the first case portion,
adhering the second side of the first case portion of the protective case to the tracked item,
aligning the tracking accessory to the first side of the first case portion and placing the tracking accessory on the first case portion thereon, and
removably securing the second case portion to the first case portion, enclosing the tracking accessory between the first and second case portions;
wherein aligning the tracking accessory to the first case portion and placing the tracking accessory thereon comprises aligning the tracking accessory to a set of radial support projections on the first case portion and placing the tracking accessory thereon; and
wherein removably securing the second case portion to the first case portion comprises pressing the second case portion onto the first case portion such that an inwardly extending flange of the second case portion interlocks to an outwardly extending flange of the first case portion.

2. The method of claim 1, wherein at least one of the first case portion and the second case portion comprise a thermoplastic elastomer.

3. The method of claim 1, wherein at least one of the first case portion and the second case portion comprise a thermoplastic polyurethane.

4. The method of claim 1, wherein at least one of the first case portion and the second case portion are impact resistant.

5. The method of claim 1, wherein the tracking accessory is removable from the protective case.

6. The method of claim 1, wherein the protective case has a height of about 0.39 inches (10 millimeters).

* * * * *